(12) United States Patent
Brandt

(10) Patent No.: US 11,745,119 B2
(45) Date of Patent: Sep. 5, 2023

(54) CHROMATOGRAPHY AND SYNTHESIS COLUMN APPARATUS AND METHOD OF ASSEMBLY

(71) Applicant: ASAHI KASEI BIOPROCESS AMERICA, INC., Glenview, IL (US)

(72) Inventor: Michael D. Brandt, Cassopolis, MI (US)

(73) Assignee: Asahi Kasei Bioprocess America, Inc., Glenview, IL (US)

( * ) Notice: Subject to any disclaimer, the term of this patent is extended or adjusted under 35 U.S.C. 154(b) by 1178 days.

(21) Appl. No.: 15/954,562

(22) Filed: Apr. 16, 2018

(65) Prior Publication Data
US 2019/0314741 A1  Oct. 17, 2019

(51) Int. Cl.
*B01D 15/22* (2006.01)
*G01N 30/60* (2006.01)

(52) U.S. Cl.
CPC ......... *B01D 15/22* (2013.01); *G01N 30/6047* (2013.01)

(58) Field of Classification Search
None
See application file for complete search history.

(56) References Cited

U.S. PATENT DOCUMENTS

| | | |
|---|---|---|
| 3,704,904 A | 12/1972 | Rizzone |
| 3,966,609 A | 6/1976 | Godbille et al. |
| 4,597,866 A | 7/1986 | Couillard |
| 4,769,141 A | 9/1988 | Couillard |
| 4,891,133 A | 1/1990 | Colvin, Jr. |
| 5,021,162 A | 6/1991 | Sakamoto et al. |
| 5,137,628 A | 8/1992 | Hart et al. |
| 5,167,809 A | 12/1992 | Mann et al. |
| 5,681,474 A | 10/1997 | Gunther et al. |
| 5,893,971 A | 4/1999 | Shalon et al. |
| 5,902,485 A | 5/1999 | Davis et al. |
| 6,090,279 A | 7/2000 | Davis et al. |
| 6,123,849 A | 9/2000 | Purdom |
| 6,190,560 B1 | 2/2001 | Mann |
| 6,277,283 B1 | 8/2001 | Davis et al. |
| 6,446,679 B2 | 9/2002 | Hofmann et al. |

(Continued)

FOREIGN PATENT DOCUMENTS

| | | |
|---|---|---|
| EP | 2324898 A2 | 5/2011 |
| WO | WO-9732207 A1 | 9/1997 |

(Continued)

OTHER PUBLICATIONS

Photograph of Novasep/Prochrom large-scale chromatography column. Available at least as early as Oct. 11, 2017.

(Continued)

*Primary Examiner* — Kara M Peo
(74) *Attorney, Agent, or Firm* — MARSHALL, GERSTEIN & BORUN LLP

(57) ABSTRACT

Chromatography and synthesis columns, assemblies, components, and methods of assembly and disassembly are disclosed including a support assembly having lifting mechanisms in each of the legs to raise and lower a frame secured to the column, a swing arm and/or carriage guiding movement of a bottom plate of the column, a bolt-free coupling between the main tube and bottom plate of the column, and upper and lower slurry ports in the main tube of the column.

19 Claims, 13 Drawing Sheets

(56) References Cited

U.S. PATENT DOCUMENTS

| | | |
|---|---|---|
| 6,676,168 B2 | 1/2004 | McAliley |
| 6,719,899 B2 | 4/2004 | Davis et al. |
| 6,736,974 B1 | 5/2004 | Mann |
| 7,419,599 B2 | 9/2008 | Andersson et al. |
| 7,452,464 B2 | 11/2008 | Uselius et al. |
| 7,452,471 B2 | 11/2008 | Windahl |
| 7,604,747 B2 | 10/2009 | Spencer et al. |
| 7,686,953 B2 | 3/2010 | Bailey et al. |
| 7,718,058 B2 | 5/2010 | Agee et al. |
| 8,137,549 B2 | 3/2012 | Andersson et al. |
| 8,343,349 B2 | 1/2013 | Eriksson et al. |
| 8,394,276 B2 | 3/2013 | Eriksson |
| 8,454,834 B2 | 6/2013 | Karlberg et al. |
| 2004/0164012 A1* | 8/2004 | Dunkley ............ G01N 30/6021 210/198.2 |
| 2006/0197358 A1 | 9/2006 | Franzini |
| 2008/0271445 A1 | 11/2008 | Bair |
| 2009/0039008 A1 | 2/2009 | Davis et al. |
| 2009/0235508 A1 | 9/2009 | Bellafiore |
| 2010/0163490 A1 | 7/2010 | Lasalle |
| 2013/0186833 A1 | 7/2013 | Eriksson |
| 2013/0341482 A1 | 12/2013 | Uselius et al. |
| 2014/0147208 A1 | 5/2014 | Devitt |
| 2015/0308420 A1 | 10/2015 | Donnally |
| 2015/0336027 A1 | 11/2015 | Eriksson et al. |

FOREIGN PATENT DOCUMENTS

| | | |
|---|---|---|
| WO | WO-2005056156 A1 | 6/2005 |
| WO | WO-2011/162678 A1 | 12/2011 |
| WO | WO-2013/191641 A1 | 12/2013 |

OTHER PUBLICATIONS

European Patent Application No. 18248023.6, Extended European Search Report, dated Apr. 25, 2019.

* cited by examiner

CHROMATOGRAPHY AND SYNTHESIS COLUMN APPARATUS AND METHOD OF ASSEMBLY

FIELD OF THE DISCLOSURE

The present disclosure generally relates to chromatography and synthesis columns and, more particularly, to base assemblies and components for chromatography and synthesis columns.

BACKGROUND

Chromatography and synthesis columns can be utilized for the large-scale purification of pharmaceuticals and fine chemicals. Columns for these uses can be quite heavy, including some that have a weight around 12,000 pounds. Routine maintenance for these columns may be required as often as every day and, even further, some facilities require that the columns be moved to a maintenance area. Columns of these types can typically sit low to the ground and have a 3 or 4 leg frame.

Routine maintenance of the column may include removing the bottom plate, ejecting (unpacking) the bed (also known as the stationary phase), capturing the bed, cleaning/inspecting/replacing the bed supports, cleaning/inspecting/replacing the sealing components or scraper seals, inspecting and wiping down the interior column walls and slurry port, reassembling the column, processing the stationary phase, re-forming the bed (packing), and, if necessary, transporting the column back to a manufacturing area.

For conventional columns, the bottom plate can be quite heavy, about 1,500 pounds, and is removed to perform one or more of the maintenance actions set forth above. By one removal approach, one or more people remove some of the bolts securing the bottom plate to the column and insert threaded rods with washers and nuts secured thereto in place of the removed bolts. The remaining bolts are then removed and jack screws are inserted in the perimeter of the bottom plate. At least four people can then repeatedly coordinate unscrewing the nuts on the threaded rods and screwing in the jack screws until the bottom plate falls onto the nuts on the threaded rods. The nuts on the threaded rods can then be unscrewed to provide a sufficient clearance between the bottom plate and the column. Thereafter, the jack screws are removed and a lift device, such as a fork lift, is brought in to lift the bottom plate enough to remove the threaded rods. The lift device must then carefully move the bottom plate to avoid damaging any of the components, which can be difficult due to the imprecise operation of many lift devices.

One maintenance action involves removing the bed from the main tube after removal of the bottom plate. By one approach, a receiver can be rolled in underneath the main tube to capture the bed as it is ejected by the piston. With some configurations, the column may positioned too low to accommodate a receiver of sufficient depth to capture the entire height of the bed. To solve this problem, the bed may be partially ejected into the receiver by a pump cart forcing downward movement of the piston and a piano wire may be used to cut the bed at a midpoint.

Assembly of the column after routine maintenance can largely be the reverse of disassembly, but can require more precision in the placement of the bottom plate by the lift device to align the bottom plate translationally, rotationally for the insertion of threaded rods and bolts, and horizontally with the main tube. Due to this complicated alignment, the column components or operators may be damaged by collision or pinch during the alignment and insertion of the heavy components. Further, the complicated process of utilizing the threaded rods and nuts to elevate and insert the bottom plate into the column can then again be performed.

Accordingly, conventional procedures can be complicated, time-intensive, expensive in time and resources, and can, at times, pose unsafe situations for operations and column components.

SUMMARY

In accordance with a first aspect, a base assembly for a chromatography and synthesis column having a main tube and a bottom plate is disclosed that includes a frame that is secured to the main tube of the column, legs mounted to the frame to support the column in an upright orientation, and lifting mechanisms of each of the legs that are configured to raise and lower the frame.

In accordance with one form, each of the legs can include a base, and the lifting mechanisms can be hydraulic cylinders where each hydraulic cylinder is supported by the base with a portion thereof engaging the frame. In accordance with a further form, the frame can include tubular leg portions extending downwardly toward the bases of the legs, where the hydraulic cylinders extend within the tubular leg portions. The legs can further include an upstanding wall that extends around a perimeter of the base, such that the upstanding wall is configured to telescope with the tubular leg portions as the hydraulic cylinders move the frame. In accordance with another form, the hydraulic cylinders can be double acting, double rod cylinders that are connected in series. In this form, the base assembly can include a control circuit that is configured to control operation of the hydraulic cylinders. In accordance with a further form, the control circuit can be an air driven hydraulic circuit and/or the control circuit can include a pendant having user inputs that are configured to lift and lower the tube by operating the hydraulic cylinders.

In accordance with another form, the base assembly can further include a rigid swing arm that has a proximal end coupled to one of the legs and a distal end coupled to the bottom plate. The swing arm is configured to guide pivoting of the bottom plate along a horizontal plane. Further, one of the legs is spaced from at least another one of the legs a distance sized so that the bottom plate can be pivoted therebetween along a radius of the swing arm. In accordance with a further form, the base assembly can further include a carriage having the bottom plate mounted thereon. So configured, the bottom plate can be conveyed on the carriage and movement of the carriage can be directed by pivoting of the swing arm. In accordance with yet a further form, the base assembly can further include one or more removable couplings that are disposed between the bottom plate and the legs to hold the bottom plate stationary while the lifting mechanisms raise the main tube. The proximal end of the swing arm can include a bearing that coupled to the one of the legs and is configured to slide therealong.

In accordance with another form, the frame has a pentagon shape that extends around a rectangular portion and a triangular portion. In this form, the legs can include two rear legs that are mounted at distal corners of the rectangular portion and a front leg that is mounted at a proximal corner of the triangular portion. In accordance with a further form, the base assembly can further include telescoping legs that are mounted at intermediate corners of the frame. Each of the legs and the telescoping legs can include casters that are mounted on ends thereof, such that the telescoping legs are configured to cooperate with the legs to provide stable movement of the column.

In accordance with another form, the base assembly, in combination with the chromatography and synthesis column, can include a plurality of pendulum members that are pivotably mounted to the main tube. Each of the plurality of pendulum members can include a stem portion and a distal, enlarged retaining portion. The bottom plate can further include an array of radially opening slots, where each of the slots are aligned with one of the plurality of pendulum members. So configured, each of the pendulum members can be pivoted so that the stem portion extends through the respective slot and the retaining portion is disposed below the bottom plate and configured to abut a bottom surface of the bottom plate to retain the bottom plate on the main tube. In accordance with a further form, the bottom plate can include a plug portion that is configured to extend into the main tube and seal to an interior surface of the main tube. The stem portion can then be sized so that the retaining portion clears the bottom plate when pivoted only when the plug portion is fully received within the main tube. In accordance with a further form, a lower, radially outward corner of the bottom plate can be chamfered to provide clearance for the retaining portion of the pendulum.

In accordance with a second aspect, a base assembly for a chromatography and synthesis column having a main tube and a bottom plate is disclosed that includes a frame that is secured to the main tube of the column, legs mounted to the frame to support the column in an upright orientation, and a rigid swing arm that has a proximal end mounted to one of the legs and a distal end mounted to the bottom plate. The swing arm is configured to guide pivoting of the bottom plate along a horizontal plane. The one of the legs is spaced from at least another one of the legs a distance sized so that the bottom plate can be pivoted therebetween along a radius of the swing arm.

In accordance with one form, the base assembly can further include a carriage having the bottom plate mounted thereto, such that the bottom plate can be conveyed on the carriage and movement of the carriage can be directed by pivoting of the swing arm.

In accordance with another form, the frame can have a pentagon shape extending around a rectangular portion and a triangular portion and the legs can include two rear legs mounted at distal corners of the rectangular portion and a front leg mounted at a proximal corner of the triangular portion. So configured, the proximal end of the swing arm can be mounted to the front leg.

In accordance with another form, the frame can have a rectangular shape with the legs mounted to corners of the frame.

In accordance with a third aspect, a method of servicing a chromatography and synthesis column is disclosed, where the column includes a main tube and a bottom plate and is supported by a base assembly that has a frame mounted to the main tube and legs mounted to the frame. The method includes uncoupling the bottom plate from the main tube, operating lifting mechanisms of each of the legs to raise the frame and the main tube, and moving the bottom plate out from underneath the main tube.

In accordance with one form, uncoupling the bottom plate from the main tube can include pivoting a plurality of pendulum members that include a stem portion and a distal, enlarged retaining portion about pivot connections with the main tube from a first position where the retaining portions are disposed below the bottom plate to a second position where the retaining portions are disposed outwardly of or above the bottom plate. In accordance with a further form, pivoting the plurality of pendulum members from the first position can include pivoting the plurality of pendulum members from a first position where the stem portions extend through radially opening slots in the bottom plate and the retaining portions are disposed below the bottom plate. In accordance with a further form, uncoupling the bottom plate from the main tube can further include operating the lifting mechanisms of each of the legs to lower the frame so that a plug portion of the bottom plate is fully received within the main tube. In accordance with a further form, uncoupling the bottom plate from the main tube can include releasably coupling the bottom plate to a plurality of the legs such that operating the lifting mechanisms of each of the legs to raise the frame and the main tube displaces a plug portion of the bottom plate from a sealing position within the main tube.

In accordance with another form, operating the lifting mechanisms of each of the legs top raise the frame and the main tube can include operating hydraulic cylinders of each of the legs having a portion thereof engaging the frame. In accordance with a further form, operating the hydraulic cylinders of each of the legs comprises operating double acting, double rod cylinders connected in series with an air driven hydraulic control circuit. In accordance with yet a further form, operating the double acting, double rod cylinders connected in series with the air driven hydraulic control circuit can include operating a pneumatic valve of a pendant.

In accordance with another form, moving the bottom plate out from underneath the main tube can include pivoting the bottom plate along a horizontal plane guided by a rigid swing arm having a proximal end coupled to one of the legs and a distal end coupled to the bottom plate between the one of the legs and another one of the legs. In accordance with a further form, the bottom plate can be mounted on a carriage and pivoting the bottom plate can include conveying the bottom plate on the carriage along a path directed by pivoting of the swing arm. In accordance with a further form, the frame can have a pentagon shape and the legs can include three legs mounted to three corners of the frame and two telescoping legs mounted to intermediate corners of the frame, and the method can further include shifting the telescoping legs to a lowered position from a raised position such that each of the legs and the removable legs support the main tube. In accordance with a further form, the method can further include pivoting the bottom plate along the horizontal plane guided by the rigid swing underneath the main tube until the bottom plate abuts an alignment stop configured to align a plug portion of the bottom plate with the main tube. In accordance with a further form, the method can further include operating lifting mechanisms of each of the legs to lower the frame and the main tube so that the plug portion of the bottom plate is inserted into the main tube to seal against an interior surface thereof and coupling the bottom plate to the main tube.

BRIEF DESCRIPTION OF THE DRAWINGS

The present disclosure may be best understood by reference to the following description taken in conjunction with the accompanying drawings, in which like reference numerals identify like elements in the several figures, in which.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

The present disclosure is generally directed to chromatography and synthesis columns, assemblies, components, and methods of assembly and disassembly. The chromatography and synthesis columns as provided herein can be easily assembled and disassembled for maintenance saving time and potential damage to the columns. The chromatography and synthesis columns can further be provided with a stable base for securely moving the columns.

Figure 1:
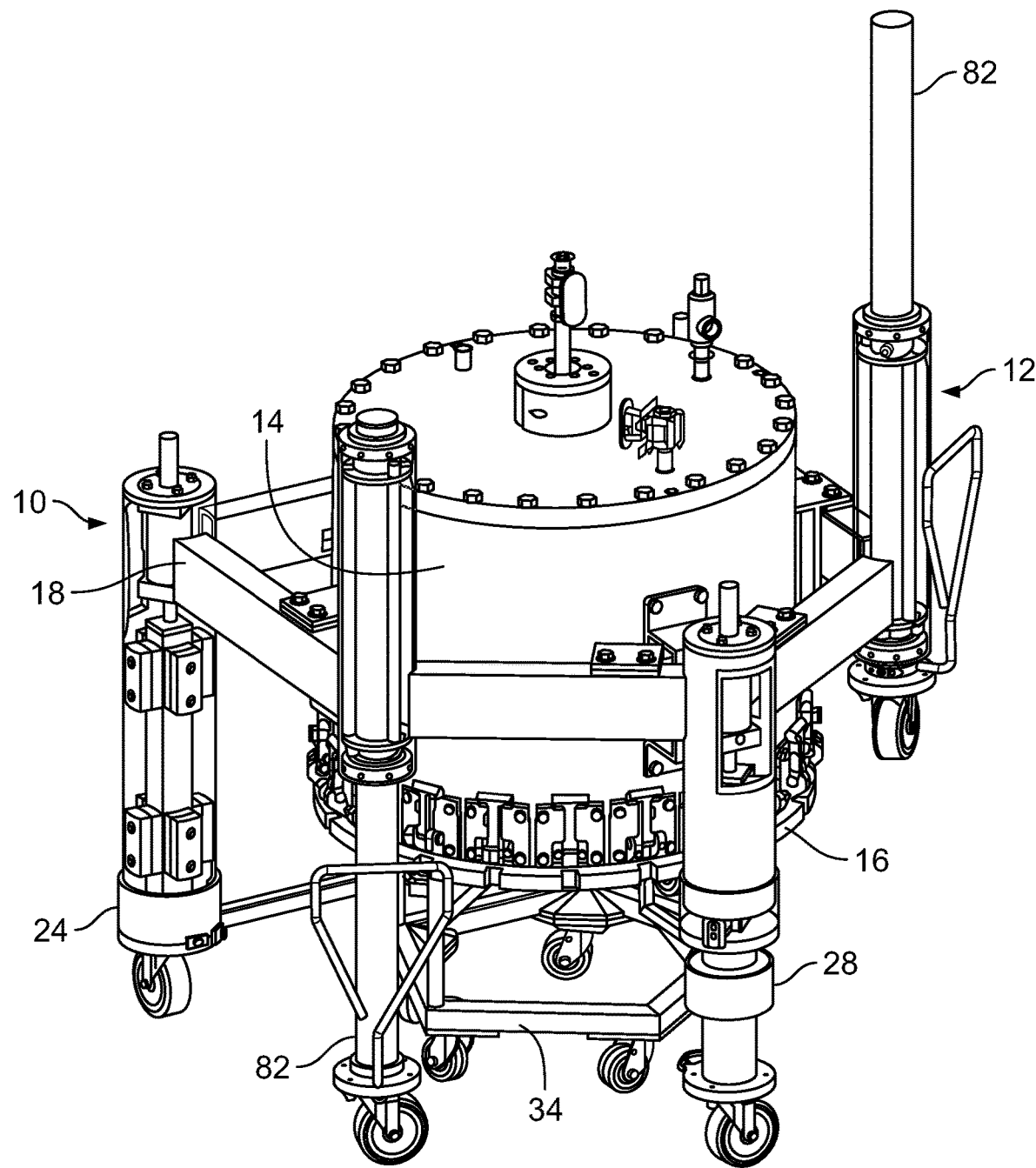
FIG. 1 is a perspective view of a chromatography and synthesis column and base assembly in accordance with various embodiments.
Figure 2:
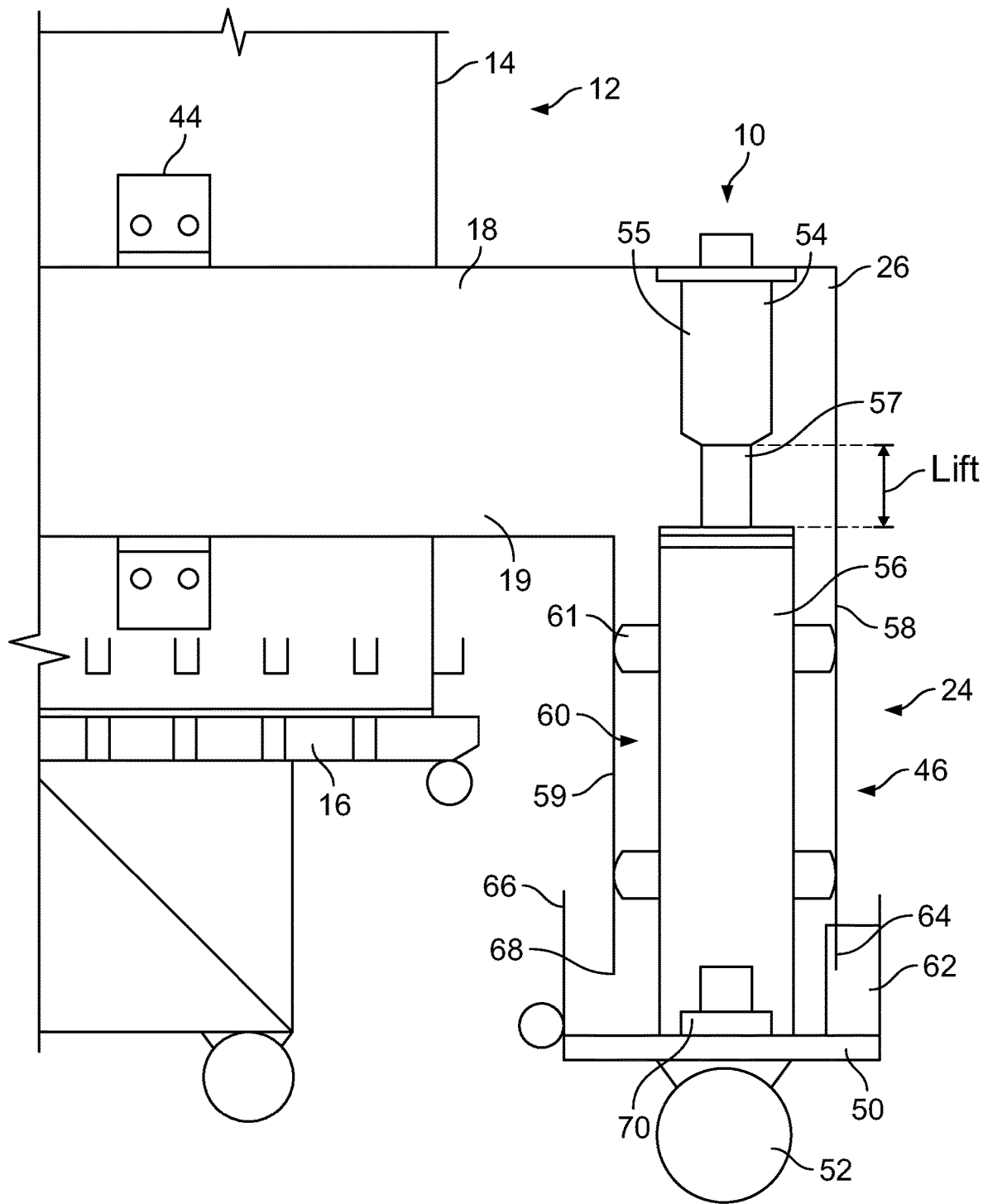
FIG. 2 is a side cross-sectional view of a leg assembly for a base assembly showing a hydraulic cylinder in accordance with various embodiments.

An exemplary support assembly 10 for a chromatography and synthesis column 12 that includes a generally annular main tube 14 and a bottom plate 16 is described with reference to FIGS. 1-12. As shown in FIG. 2, in one form, the support assembly 10 includes a rigid frame 18 that has a house-shaped pentagon configuration with cross-members 19 extending around a rear rectangular portion 20 and a forward triangular portion 22. In the illustrated form, the frame 18 is sized to extend around the column 12 such that the column 12 is disposed both within the rectangular and triangular portions 20, 22.

The support assembly 10 further includes two rear legs 24 that are mounted to the frame 18 at rear corners 26 of the rectangular portion 20 and a front leg 28 mounted to the frame 18 at a forward corner 30 of the triangular portion 22. As shown, the frame 18 is configured so that the forward corner 30 and front leg 28 align with a midpoint of the frame cross-member 19 extending between the rear corners 26. Further, in one form, the front leg 28 is set a distance from the column 12 generally equal to the closest perpendicular spacing of the column 12 to the three cross-members 19 of the frame 18 in the rectangular portion 20.

In some embodiments, the support assembly 10 can be configured to lift the column 12 to thereby ease removal of the bottom plate 16 and other maintenance actions. To accomplish this, as shown in FIGS. 1-6, the frame 18 is secured to the main tube 14 using brackets 44 or other suitable methods, such as welding, and lower leg assemblies 46, 48 for the rear legs 24 and front leg 28, respectively, cooperate to lift the frame 18 and the column 12 secured thereto.

Figure 3:
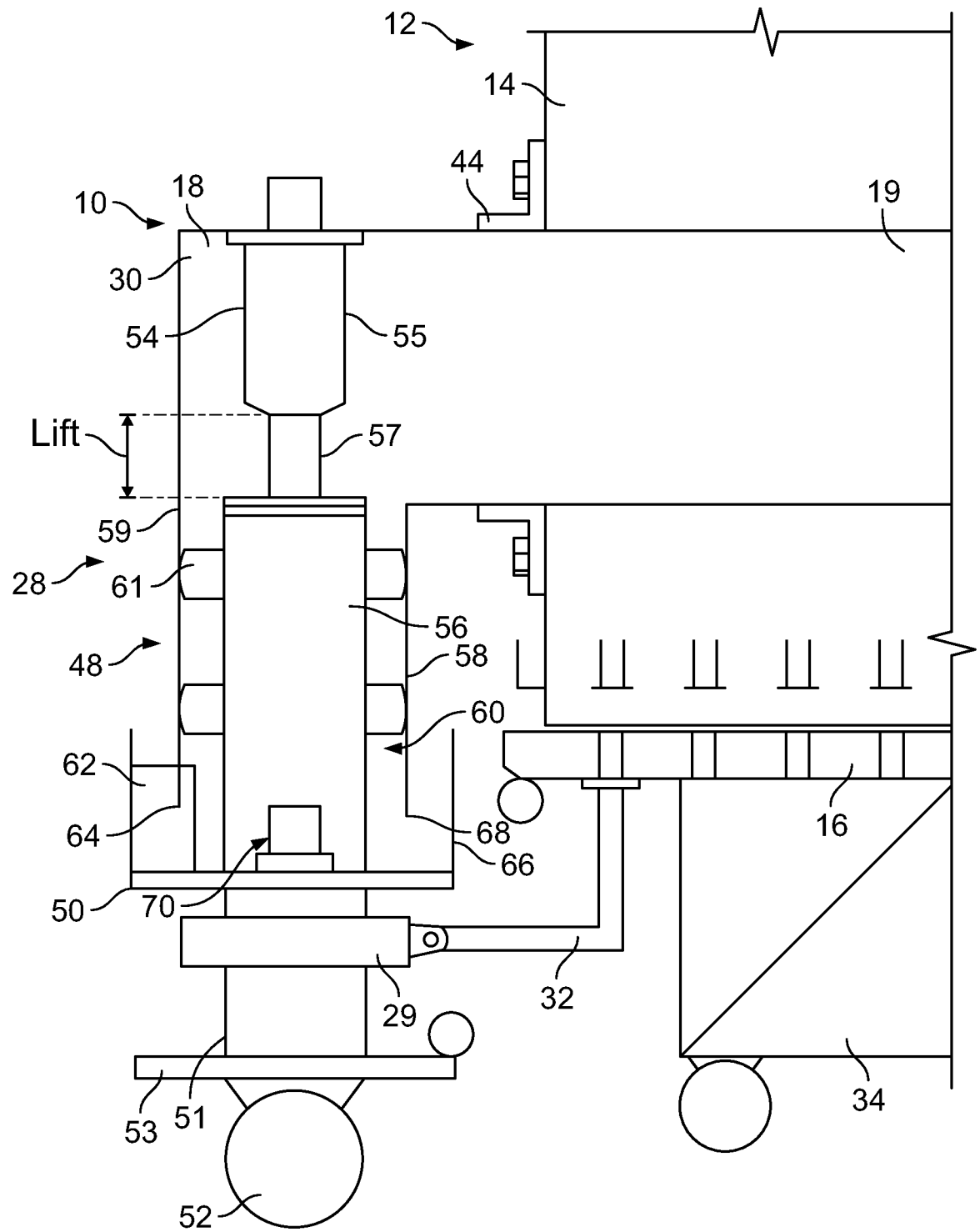
FIG. 3 is a side cross-sectional view of a leg assembly for a base assembly showing a hydraulic cylinder and swing arm in accordance with various embodiments.
Figure 4:
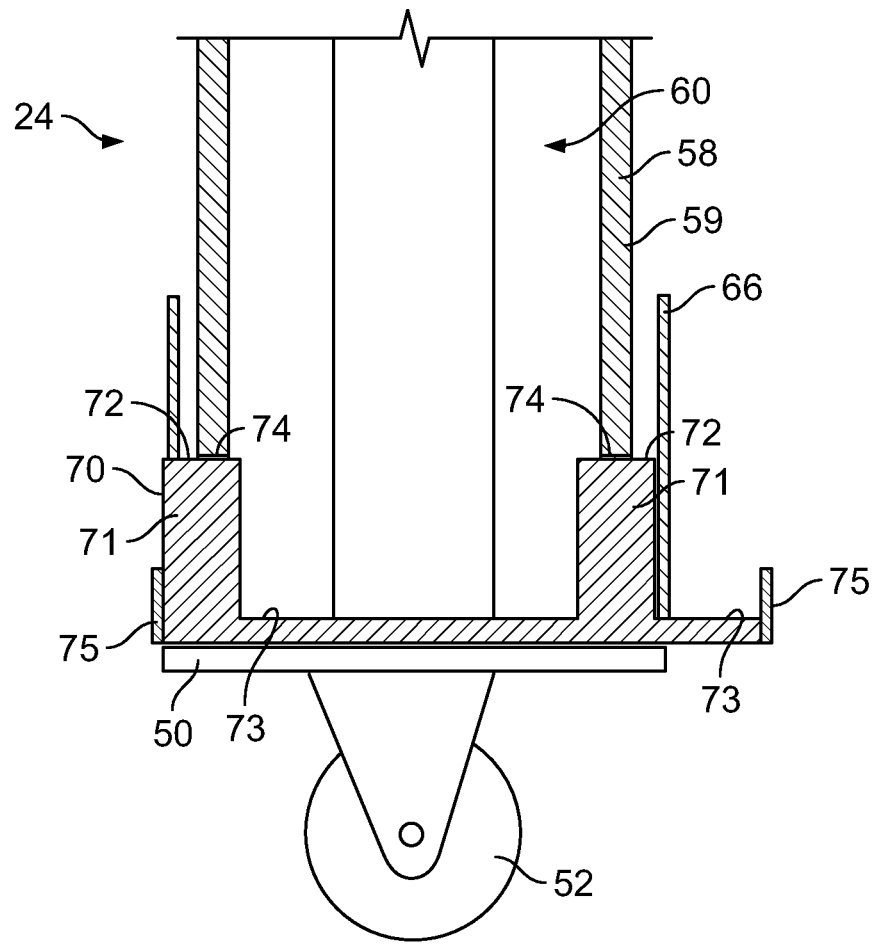
FIG. 4 is a side cross-sectional view of a leg assembly for a base assembly showing a guide block in accordance with various embodiments.

As shown in FIGS. 2-4, the lower leg assemblies 46, 48 of the rear legs 24 and front leg 28 include a base 50, a caster 52 mounted to an underside of the base 50, a hydraulic cylinder 54 including a barrel 55 and a piston rod 57, and a support 56 disposed between the base 50 and the hydraulic cylinder 54. The base 50 and support 56 are sized to position the hydraulic cylinder 54 so that movement of the piston rod 57 results in a desired amount of upward or downward movement of the frame 18 and the main tube 14. So configured, the lower leg assemblies 46, 48 control upward and downward movement of the frame 18 by raising and lowering the piston rod 57 of the hydraulic cylinder 54. In the illustrated form, the hydraulic cylinders 54 are inverted with the barrel 55 coupled to the frame 18. This advantageously avoids movement of hydraulic hoses and other components relative to the frame 18.

In order to orient and couple the lower leg assembly 46 to the frame 18, the frame 18 includes downwardly depending tubular leg portions 58 disposed at the corners 26, 30 that have a vertical sidewall 59 extending around an interior 60 thereof. The leg portions 58 are sized so that the support 56 and the hydraulic cylinder 54 can extend upwardly into the interior 60 thereof. Bearings 61 are disposed along the height of and coupled to the support 56 to contact the leg portion sidewall 59 to orient the lower leg assembly 46 within the frame leg portion 58 as the hydraulic cylinder 54 moves the frame 18 upwardly and downwardly.

To further ensure that the frame leg portion 58 is aligned with the base 50, the base 50 can include a block 62 having a vertical slot 64 extending through a portion thereof. The block 62 is positioned on the base 50 so that the sidewall 59 of the leg portion 58 shifts therein during lifting and lowering operations. Further, the block 62 can be configured to prevent the lower leg assembly 46, 48 from rotating relative to the frame 18.

In order to shield the moving components of the support assembly 10 during lifting and lowering operations, the base 50 can include an upstanding wall 66 that extends around a perimeter thereof. As shown, the wall 66 is spaced outwardly of the sidewall 59 of the leg portions 58 and has a height to project above a lower edge 68 of the leg portions 58 with the hydraulic cylinder 54 in a raised configuration. So configured, the leg portion 58 and the wall 66 telescope with respect to one another during lifting and lower operations, which effectively prevents a user from inadvertently putting a hand or other object underneath the frame 18.

By a further approach, as shown in FIG. 4, the leg assemblies 46, 48 can include a height guide member 70 that is slidable along the base 50. The guide member 70 includes raised portions 71 that project upwardly towards the frame 18. The raised portions 71 are configured so that when the leg portion 58 is lowered, the lower edge 68 abuts a top surface 72 of the raised portion 71 resulting in the frame 18 being disposed at a height suitable for operation. For storage, a user can slide the height guide member 70 so that the raised portions 71 are misaligned with respect to the sidewall 59 and a lowering operation causes the edge 68 to abut a lower surface 73 of the guide member 70. As shown in FIG. 4, the upstanding wall 66 of the base 50 can include openings 74 extending therethrough to allow the guide member 70 to be slid to a desired position on the base 50. Further, to keep the guide member 70 disposed on the base 50, the guide member 50 can include end stops 75 that are configured to abut the upstanding wall 66 or base 50 when the guide member 50 is slid from one end to the other. By one approach, the end stops 75 can be utilized to position the guide member 70 in the raised or lowered configurations, allow a user to simply shift the guide member 70 until the desired end stop 75 prevents further movement.

Due to the high precision required to insert and remove the bottom plate 16, by one approach, the hydraulic cylinders 54 can be configured to operate in lockstep, providing synchronized up and down movement of the frame 18 and, therefore, the main tube 14. The asymmetrical loading on the three lifting leg assemblies 46, 48 due to the offset positioning of the column 12 within the frame 18 makes synchronized movement more difficult.

Figure 5:
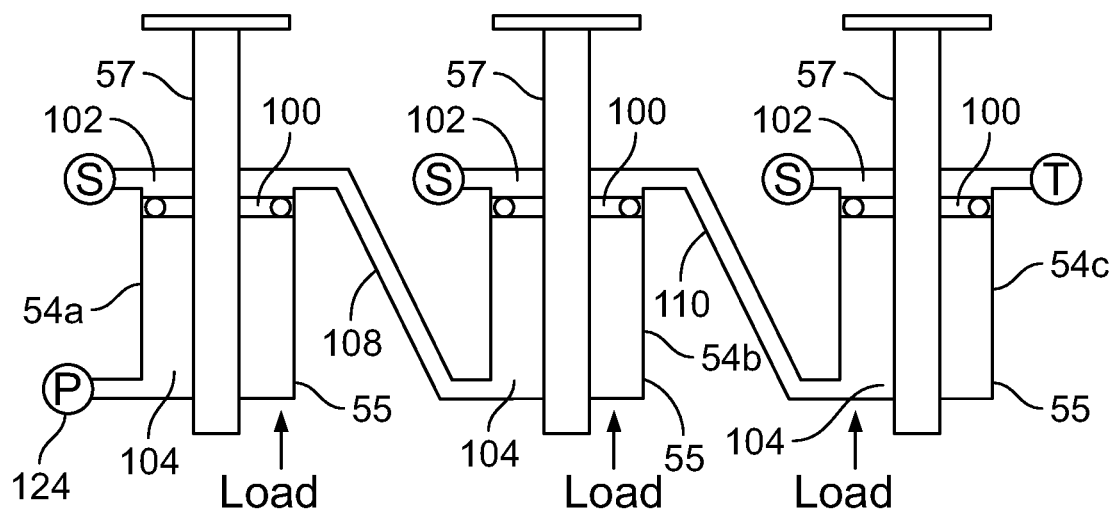
FIG. 5 is a side elevational view of the chromatography and synthesis column and base assembly of FIG. 10 with the removable leg mounted thereto in accordance with various embodiments.
Figure 6:
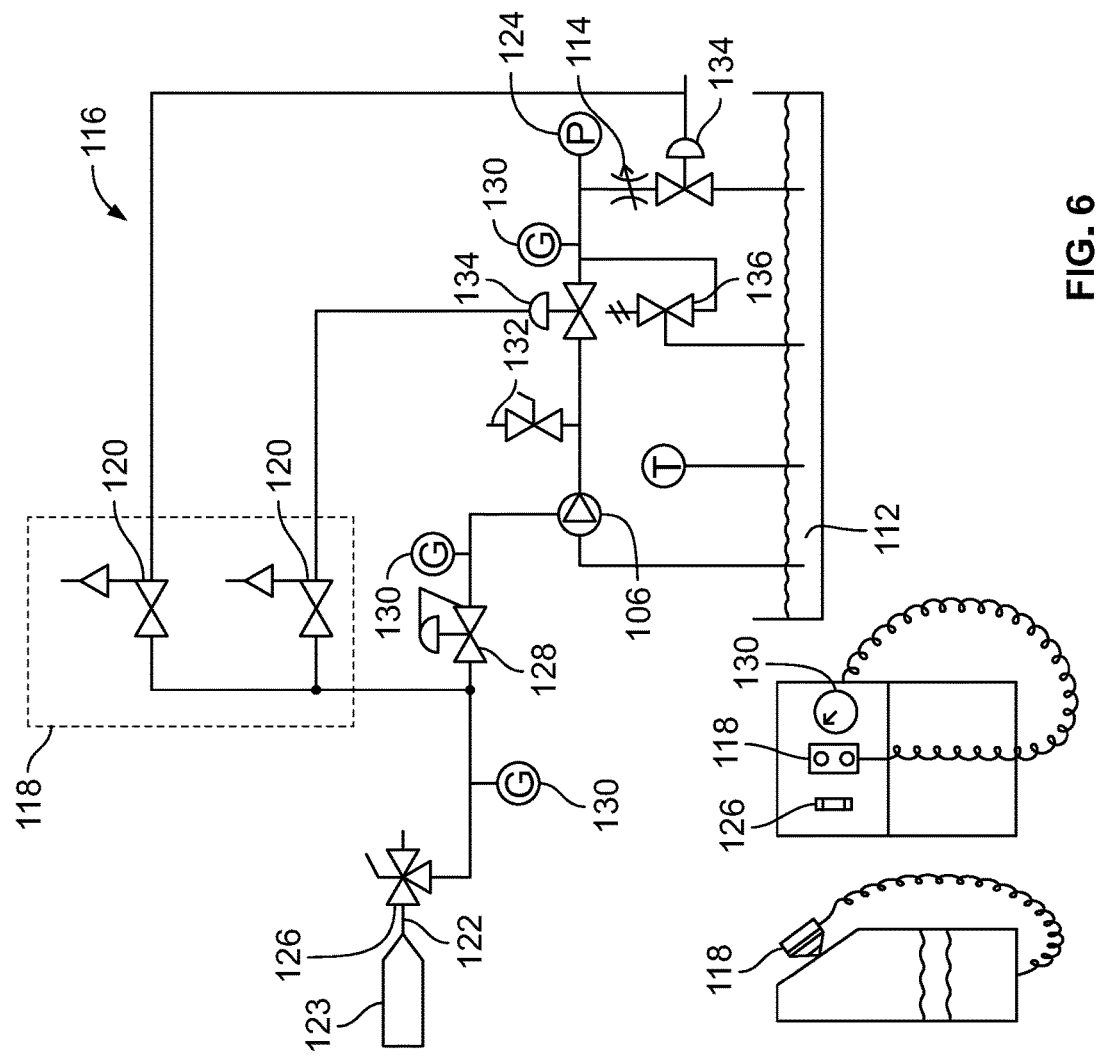
FIG. 6 is a side cross-sectional schematic view of a hydraulic cylinder system in accordance with various embodiments.

To accomplish a coordinated lift, as shown in FIG. 5, the hydraulic cylinders 54 can be double acting cylinders. The double rod configuration makes the area of the exposed piston 100 equal in each chamber 102, 104 of the double acting cylinder 54. This allows one pump 106 (FIG. 6) to synchronize multiple cylinders 54 and provide the coordinated descent of the cylinders 54 when there is an uneven load distributed across the cylinders 54. As illustrated in FIG. 5, the cylinders 54 are connected in series. A first closed system 108, which is filled with a hydraulic fluid as understood, is established between the top chamber 102 of the first cylinder 54a and the bottom chamber 104 of the second cylinder 54b. A second closed system 110 is established between the top chamber 102 of the second cylinder 54b and the bottom chamber 104 of the third cylinder 54c. As the bottom chamber 104 of the first cylinder 54a is being filled by hydraulic fluid, the top chamber 102 of the first cylinder 54a will fill the bottom chamber 104 of the second cylinder 54b. As the bottom chamber 104 of the second cylinder 54b is being filled, the top chamber 102 of the second cylinder 54b will fill the bottom chamber 104 of the third cylinder 54c. As the bottom chamber 104 of the third cylinder 54c is being filled, the top chamber 102 will express hydraulic fluid into a reservoir 112 supplying the pump 106 for the first cylinder 54a. While this hydraulic configuration of the system 108 is inefficient relative to traditional hydraulic cylinders, the double rod configuration of the cylinders 54 reduces the area of exposed piston 100 and the cylinders 54 in series adds the load on all of the cylinders 54 together and applies the total load to the reduced area of the piston 100 of the first cylinder 54a. This disadvantage can be tolerated because while the columns 12 are large, the hydraulic cylinders 54 are more than sufficient to handle the load, and operating the cylinders 54 in sync provides a significant advantage of perfectly synchronized cylinders 54 moving the frame 18, and the column 12 secured thereto, upwardly and downwardly.

Figure 9:
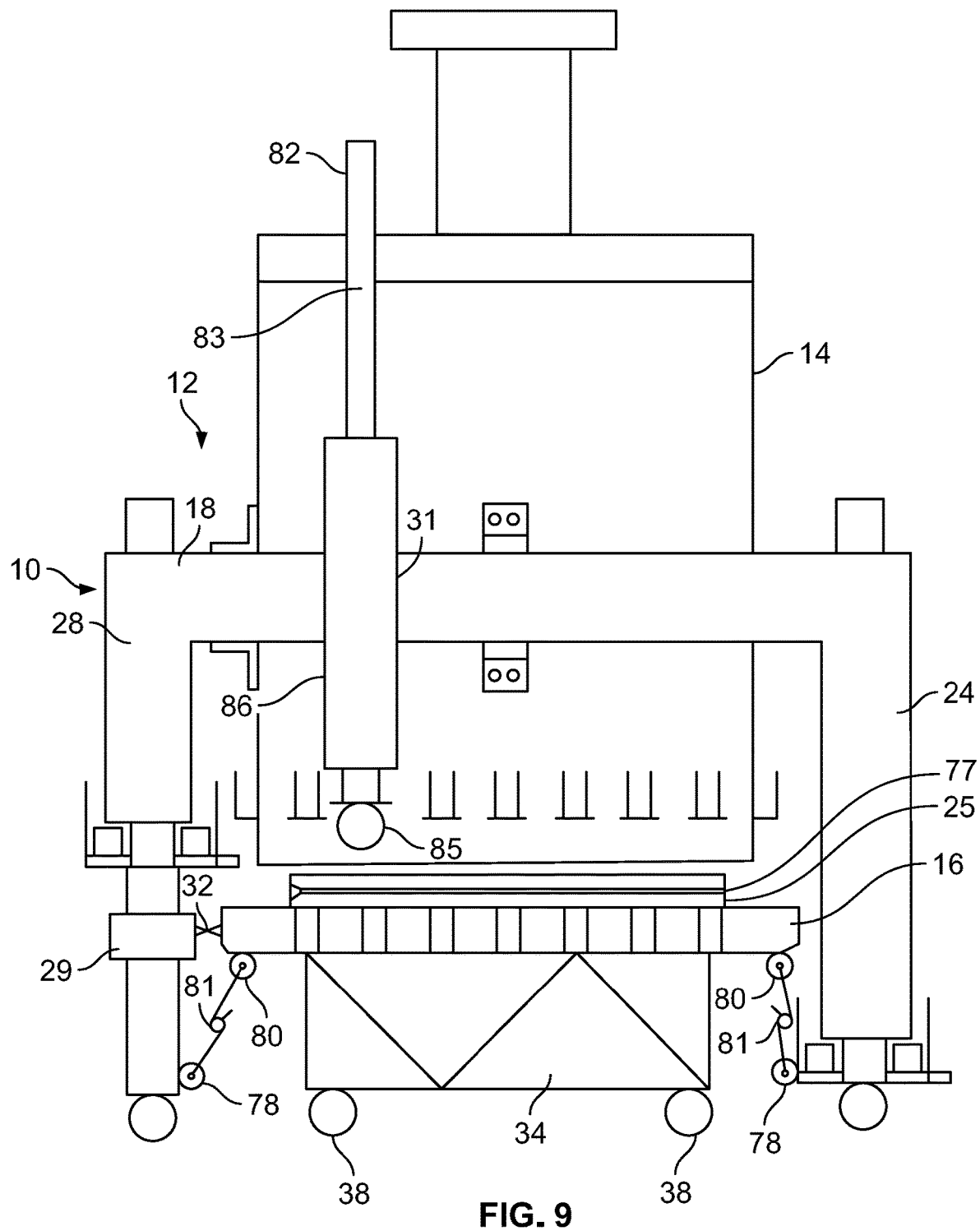
FIG. 9 is a side elevational view of a chromatography and synthesis column and base assembly with a telescoping leg in accordance with various embodiments.

The reverse operations happen when lowering the frame 18. The load of the column 12 and frame 18 is used to drive the cylinders 54 downwardly and, as shown in FIG. 9, a metering valve 114 on the first cylinder 54a defines the rate of descent of all the cylinders 54. The load pushing down on the third cylinder 54c causes the bottom chamber 104 to fill the top chamber 102 of the second cylinder 54b. At the same time, the top chamber 102 of the third cylinder 54a is filling by suction of the fluid in the reservoir 112 supplying the pump 106. The top chamber 102 of the second cylinder 54b being filled by the third cylinder 54c and the load on the second and third cylinders 54b, 54c causes the bottom chamber 104 of the second cylinder 54b to fill the top chamber 102 of the first cylinder 54a. The top chamber 102 of the first cylinder 54a being filled by the second cylinder 54b and the load on the first, second and third cylinders 54 causes the bottom chamber 104 of the first cylinder 54a to express fluid. The metering valve 114 put on the fluid flow from the bottom chamber 104 of the first cylinder 54a defines the rate of descent of all three cylinders 54. So configured, the three cylinders 54 work in lockstep to move the frame 18 and column 12 upwardly and downwardly.

FIG. 9 is a process and instrument diagram for an example air-driven hydraulic control circuit 116. As shown, the control circuit 116 is provided for driving movement of the cylinders 54 by controlling operation of the pump 106. In the illustrated form, the pump 106 is an air-over-hydraulic pump and the control circuit 116 is air driven. It will be understood that other circuits, including electrical, could alternatively be utilized to accomplish the hydraulic pump and control circuit. By one approach, a user can provide input to the control circuit 116 using a pendent 118 having pushbutton vents 120 to provide convenience for the operator and to facilitate one-man operation. It will be understood that the valve components of the pendent 118 can be located elsewhere and/or alternative embodiments for the circuit can perform the same or similar functions.

The control circuit 116 includes an inlet 122 from an air supply 123 suitable to drive the pump 106 to the pressure required by the cylinders 54 to lift the frame 18 and column 12 and an outlet 124 connected to the cylinders 54. As shown, the control circuit 116 can further utilize a 3-way manual valve 126 as an on/off control, a pressure regulator 128, various pressure gauges 130, a manual shut-off service valve 132, pneumatic valves 134, and a pressure relief valve 136.

With the control circuit 116 shown in FIG. 9, movement of the cylinders 54 can be locked out by the on/off valve 126 which simultaneously vents the pneumatics whether the cylinders 54 are moving or sitting idle. A first pressure gauge 130 is included so the inlet air pressure can be confirmed when the on/off valve 126 is in the on position and that the pneumatic pressure is vented when the on/off valve 126 is in the off position. The pendent 118 has two pneumatic valves 120 that are normally closed. To lower the frame 18 and column 12, the "down" valve 120 is in communication with the on/off valve 126 and the actuator of the down shutoff valve 134. To raise the frame 12 and column 12, the "up" valve 120 is in communication with the on/off valve 126 and the actuator of the up-shutoff valve 134. The pressure regulator 128 is in communication with the on/off valve 126 and the air side of the air driven pump 106. A second gauge 130 is in communication with the pressure regulator 128 and the air side of the air driven pump 106. The liquid side of the air driven pump 106 is in communication with the fluid in the hydraulic fluid reservoir 112 and the up-shutoff valve 134. The pressure relief valve 136 is in communication with the hydraulic fluid reservoir 112, the up-shutoff valve 134, the metering valve 114, and the output 124 to the hydraulic cylinders 54. A third pressure gauge 130 is in communication with the up-shutoff valve 134, the pressure relief valve 136, the metering valve 114, and the output 124 to the hydraulic cylinders 54.

Figure 7:
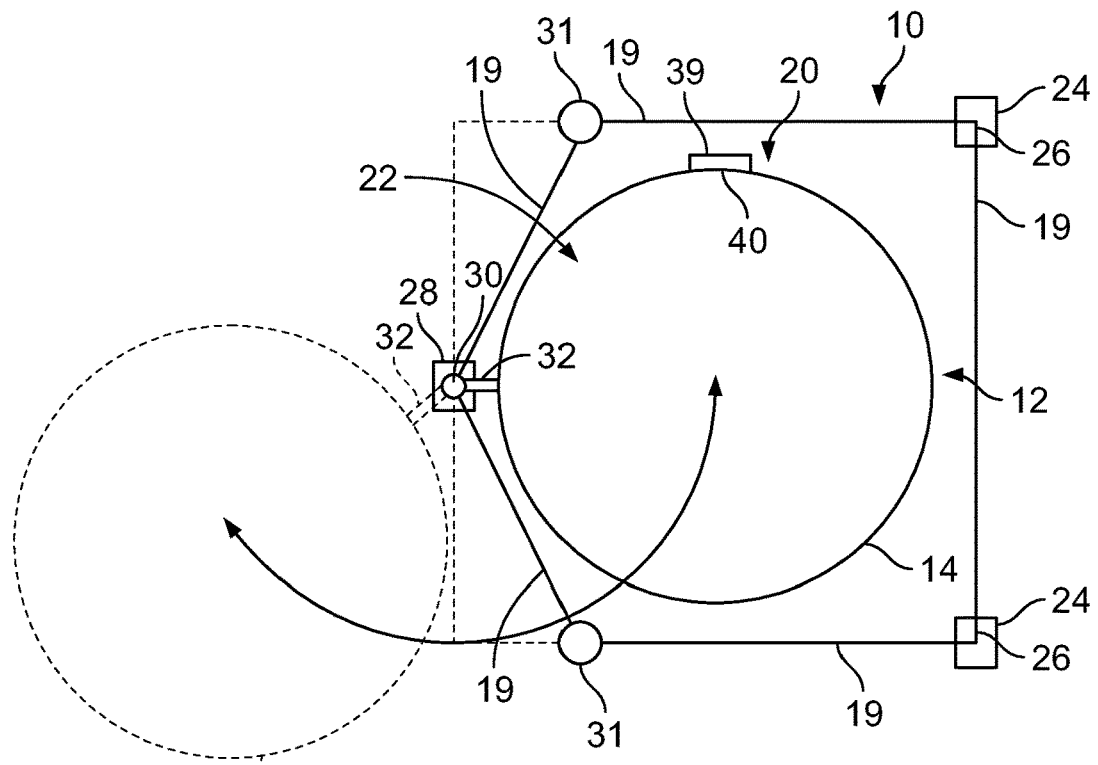
FIG. 7 is a top schematic view of a chromatography and synthesis column and base assembly with a swing arm configured to guide pivoting of a bottom plate in accordance with various embodiments.

As discussed above, the bottom plate 16 of the column 12 is removed for many maintenance actions. In order to easily and repeatably move the bottom plate 16 from underneath the main tube 14 and realign the bottom plate 16 with the main tube 14, a swing arm 32 is provided that pivotably couples the bottom plate 16 to the support assembly 10 at the front support leg 28 via a bearing 29 (FIG. 3). The swing arm 32 is rigid so that the bottom plate 16 can be pivoted along a set radius from the front support leg 28. Advantageously, as shown in FIG. 7, the three-legged configuration of the support assembly 10 provides sufficient clearance between the front leg 28 and the rear legs 24 so that the bottom plate 16 can easily pass therebetween.

Figure 8:
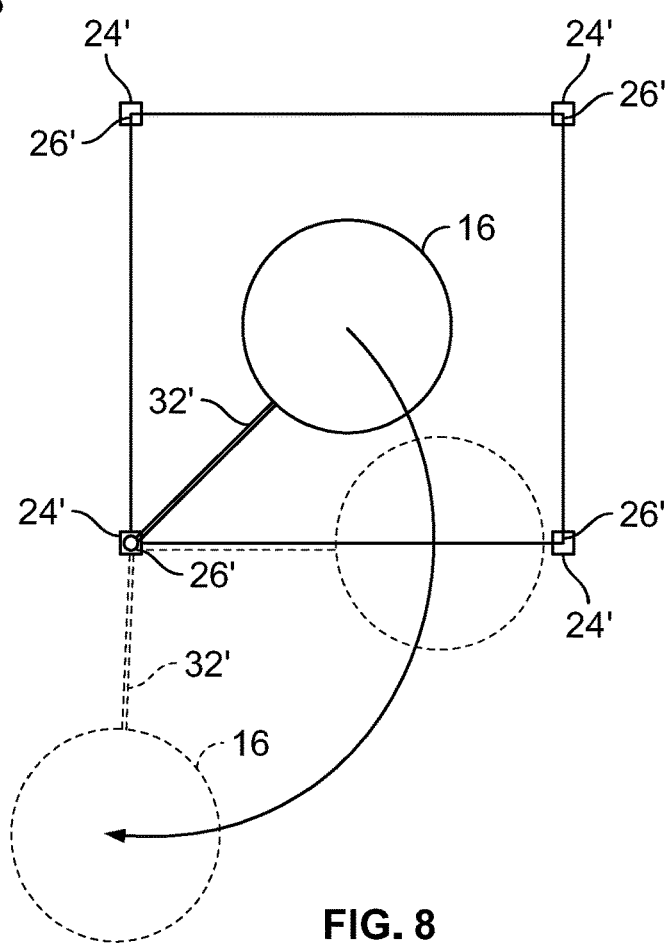
FIG. 8 is a top schematic view of an alternative chromatography and synthesis column and base assembly with a swing arm configured to guide pivoting of a bottom plate in accordance with various embodiments.

In an alternative embodiment as shown in FIG. 8, a frame 18' can have a rectangular configuration where the legs 24' mounted to corners 26' of the frame 18' are spaced a sufficient distance from one another for the bottom plate 16 to be pivoted between two adjacent legs 24' by a rigid swing arm 32'. While this configuration may be suitable for many purposes, the footprint of the frame 18' is larger in comparison to the size of the column 12 as with the above embodiment.

By one approach, as shown in FIG. 9, to aid in moving the bottom plate 16, the bottom plate 16 can be mounted to a carriage 34 having a housing 36 or other supporting framework and casters 38. The carriage 34 allows the weight of the bottom plate 16 to be supported on the casters 38 rather than a separate lifting device, such as a fork lift. With this configuration, a user can easily maneuver the carriage 34 on the casters 38, which avoids the precarious movements of a lift device. Moreover, the carriage 34, along with the swing arm 32, ensures that movement of the bottom plate 16 is precisely controlled along the radius of the swing arm 32 so that contact, and any resulting damage, between the bottom plate 16 and the support assembly 10 is prevented.

As discussed above, moving the bottom plate 16 back underneath the main 14 to insert a plug portion 25 thereof into the main tube 14 requires that the bottom plate 16 be aligned translationally, rotationally, and horizontally with the main tube 14. The swing arm 32 advantageously provides easy, repeatable alignment because the bottom plate 16 can be fixedly mounted to the swing arm 32 so that the plate 16 cannot rotate relative to the swing arm 32 and the swing arm 32, and carriage 34, can maintain the bottom plate 16 in an horizontal orientation. Further, a stop 39 can be mounted to the support assembly 10 and/or the main tube 14 so that an inwardly facing surface 40 of the stop 39 positions the bottom plate 16 in translational alignment with the main tube 14 when the bottom plate 16 abuts the surface 40. So configured, a user can simply push the bottom plate 16 on the carriage 34 and the swing arm 32 will direct movement along the radius thereof until the bottom plate 16 contacts the stop 39.

A lifting mechanism, such as the hydraulics 54 discussed above, can further be utilized to reliably remove the bottom plate 16 from the main tube 14. As discussed above, the bottom plate 16 includes a plug portion 25 that projects into and seals against an interior surface 76 of the main tube 14 with one or more seals 77. As shown in FIG. 9, the lower leg assemblies 46, 48 can include an anchor 78, such as a ring as illustrated, and the bottom plate 16 can include a corresponding anchor 80. A removable or releasable coupling 81 can then be installed between the anchors 78, 80 to couple the bottom plate 16 to the lower leg assemblies 46, 48 when the frame 18 is in the lowered position holding the bottom plate 16 in a fixed position. In the illustrated form, the three couplings 81 to the rear and front legs 24, 28 hold the bottom plate 16, so that, when the hydraulic cylinders 54 raise the frame 18, the bottom plate 16 and carriage 34 remain stationary. As the main tube 14 is raised, the plug portion 25 is pulled from within the main tube 14 until the plug portion 25 has sufficient clearance from the main tube 14. Thereafter, the couplings 81 can be removed or released and the bottom plate 16 can be pivoted on the swing arm 32 to a position exterior of the frame 18 through the spacing between the front and rear legs 28, 24 as discussed above. It will be understood that the anchors 78, 80 and couplings 81 can take any suitable form, such as hooks, straps, fasteners, and so forth. Further, in another form, the carriage 34 can include one or more of the anchors 78 rather than the bottom plate 16.

Referring back to FIG. 3, due to the swing arm 32, the lower leg assembly 48 of the front leg 28 can be modified relative to the rear legs 24 to include structure in addition to the components described above. More specifically, the lower leg assembly 48 includes a lower support 51 and base 53, with the caster 52 mounted to the lower base 53. The lower support 51 has a cylindrical configuration and is sized so that the bearing 29 of the swing arm 32 coupled thereto can freely rotate and has room to move upwardly and downwardly as the hydraulic cylinders 54 move the frame 18.

Figures 10, 11:
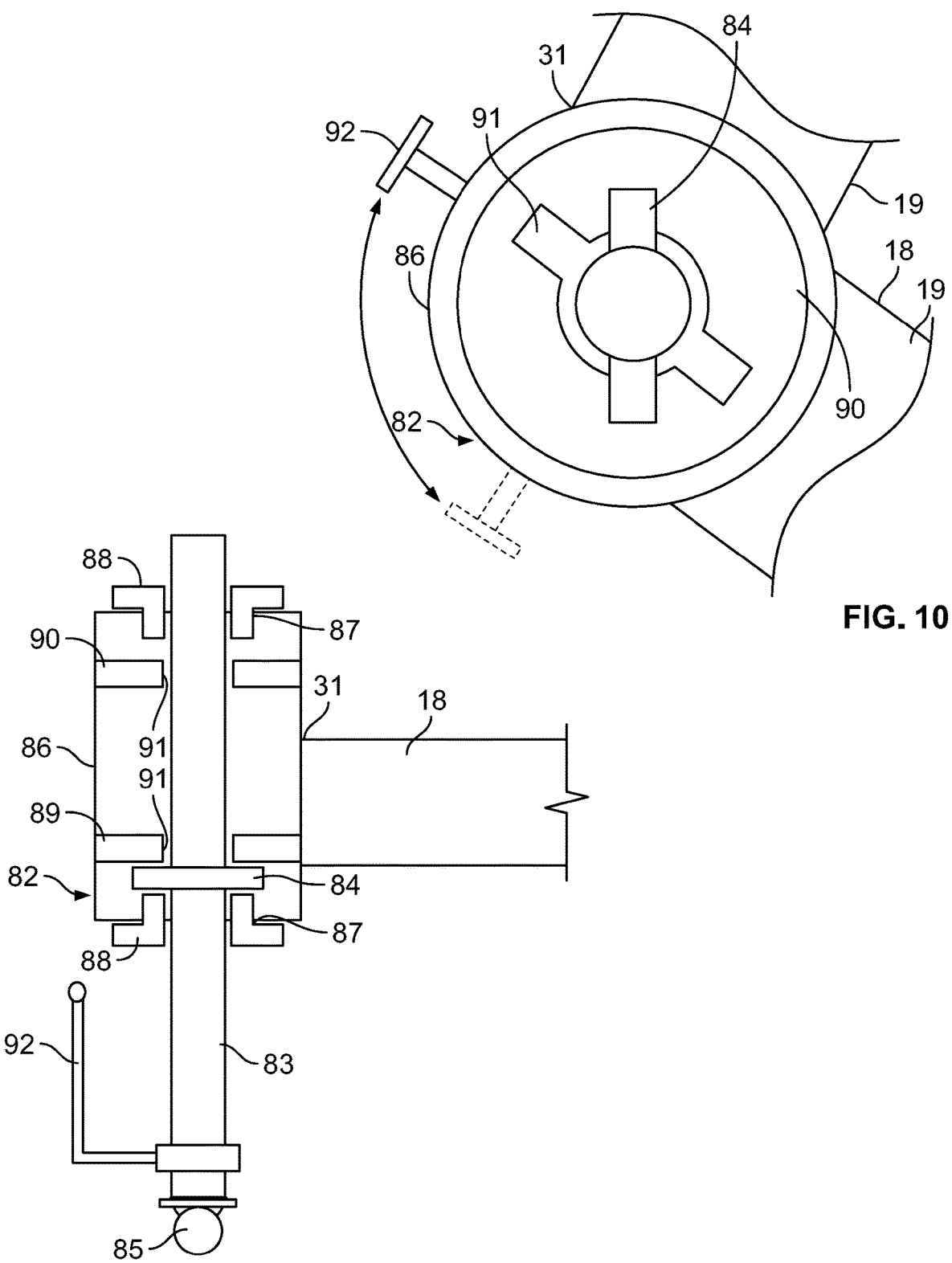
FIG. 10 is a top cross-sectional view of the telescoping leg of FIG. 7 in accordance with various embodiments.
FIG. 11 is a side cross-sectional view of the telescoping leg of FIG. 7 in accordance with various embodiments.
Figure 12:
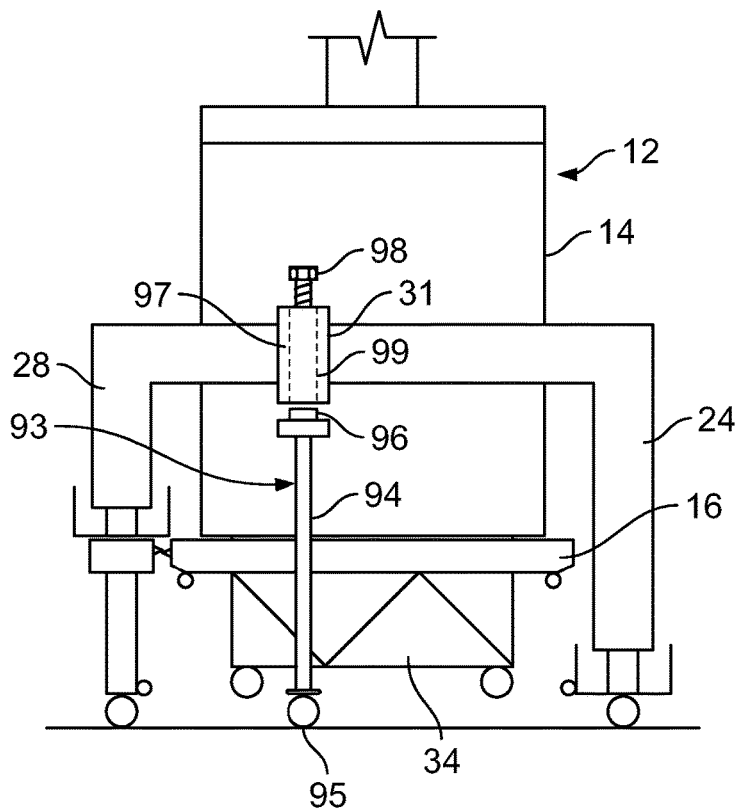
FIG. 12 is a side elevational view of a chromatography and synthesis column and base assembly with a removable leg being mounted thereto in accordance with various embodiments.
Figure 13:
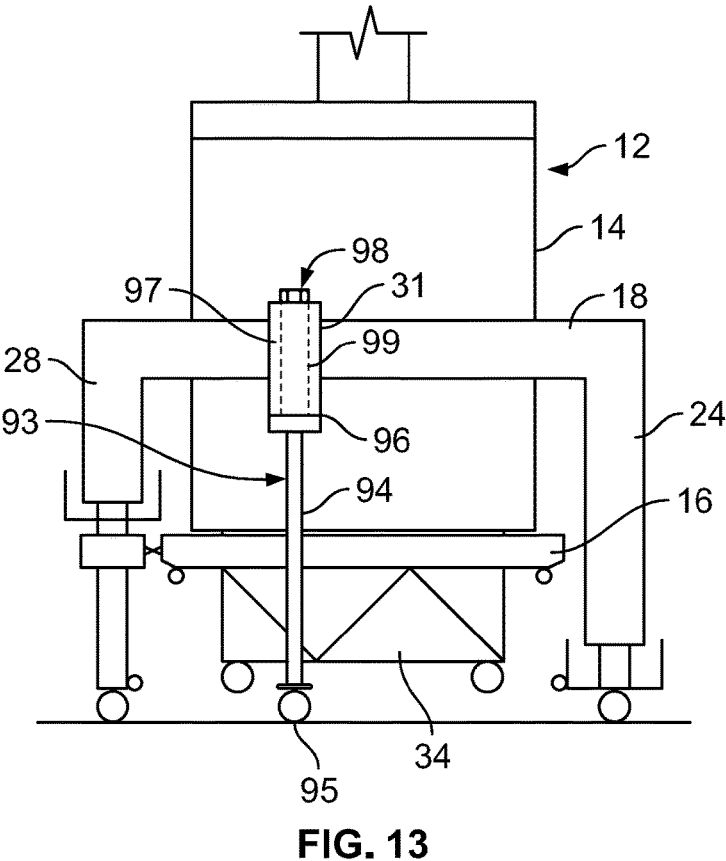
FIG. 13 is a diagrammatic view of an air driven hydraulic control circuit in accordance with various embodiments.

As is understood, support assemblies 10 having three legs may result in less stable movement for the column 12, especially where the weight of the column 12 has asymmetrical loading as with the frame 18 discussed above. To provide additional support, as shown in FIGS. 9-11, the support assembly 10 can include telescoping legs 82 at intermediate corners 31 of the frame 18 between the rear corners 26 and the front corner 30. By having a telescoping functionality, the legs 82 can be moved out of the path of the bottom plate 16 as the bottom plate is moved out from beneath the main tube 14, such as by using the swing arm 32 described above.

As shown in FIGS. 10 and 11, each telescoping leg 82 includes an elongate shaft 83 with a cross bar 84 extending outwardly from an intermediate portion thereof and a caster 85 mounted on a distal end thereof. A telescoping housing 86 is mounted to the frame 18 at the corner 31. The housing 86 includes openings 87 extending through the top and bottom thereof so that the leg 82 can extend therethrough. If desired, the housing 86 can include bearings 88 disposed around the openings 87 to align and aid in movement of the leg 82.

As shown, the housing 86 includes first and second position plates 89, 90 that extend across the interior of the housing 86. The first and second position plates 89, 90 each further include a key opening 91 that extends vertically therethrough that has a shape corresponding to the cross bar 84 of the leg 82. The first position plate 89 is disposed at a height so that with the cross-bar 84 positioned below the first position plate 89, as shown in FIG. 11, the leg 82 is aligned with the other legs 24, 28 of the support assembly 10. As such, the support assembly 10 in this configuration has five legs to support the weight of the column 12 and provides stable movement. The second position plate 90 is disposed above the first position plate 89 and is configured to hold the leg 82 in an elevated position out of the way for removal of the bottom plate 16. To move the leg 82 to the elevated position, a user can align the cross bar 84 with the key opening 91 of the first position plate 89 and, subsequently, the key opening 91 of the second position plate 90. Thereafter, the user can rotate the leg 82 so that the cross bar 84 is not aligned with the key opening 91 and the weight of the leg 82 is supported on the second position plate 90. If desired, each leg 82 can include a handle 92 secured thereto to help a user to move the leg 82 to the elevated position.

By another approach, in order to provide increased stability for the support assembly 10, the corners 31 of the frame 18 can be utilized for the attachment of removable legs 93. The removable legs 93 include an elongate shaft 94, casters 95 mounted at a distal end of the shaft 94, and a coupling portion 96 at a proximal end of the shaft 94. The corners 31 include a corresponding coupling portion 97 so that the legs 93 can be removably secured thereto. In the illustrated form, the leg coupling portion 96 includes a threaded fastener 98 that can be inserted through a throughbore 99 extending through the frame 18 and into the proximal end of the shaft 88. By another approach, the leg 93 can include a threaded fastener and the throughbore 99 can be threaded and/or a nut can secure the leg 93 to the frame 18. It will be understood that other coupling methods, such as snap-fit, friction, and so forth, are within the scope of this disclosure.

Attaching and removing the removable legs 93 can be aided by frame lifting mechanisms, such as the hydraulics 54 discussed above. More specifically, the hydraulics 54 can lift the frame 18 to a raised position and the removable legs 93 can then easily be secured to the frame 18 as discussed above. Thereafter, the hydraulics 54 can lower the frame 18 until all of the legs 24, 28, 93 support the cylinder 12 for movement. When removal of the bottom plate 16 is desired, the frame 18 can then be lifted and the legs 93 removed so that the bottom plate 16 can be pivoted out between the front 28 and rear legs 24, as discussed above.

Figure 14:
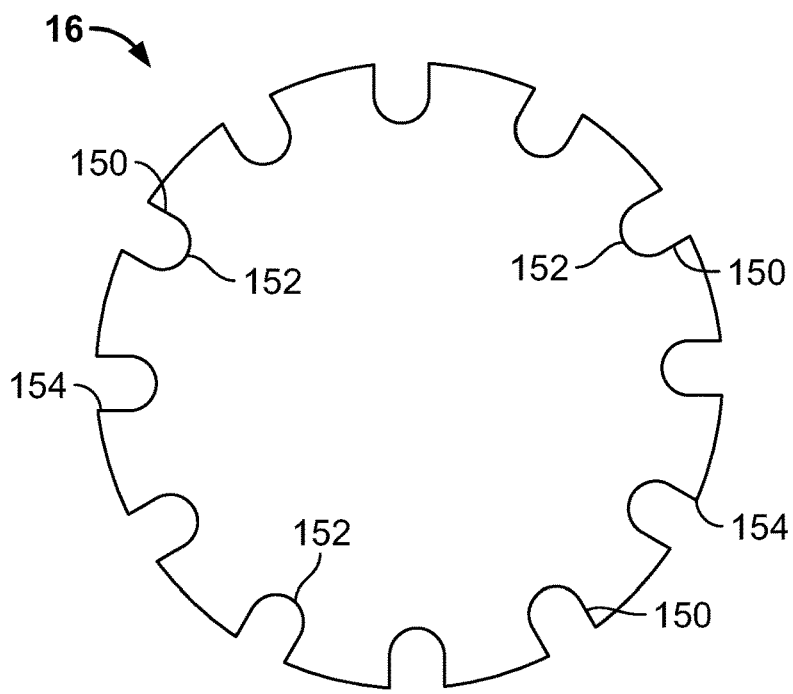
FIG. 14 is a top plan view of a bottom plate for a chromatography and synthesis column with radially opening slots in accordance with various embodiments.

In a further embodiment shown in FIGS. 14-17, the bottom plate 16 can be easily secured to the main tube 14 without the use of bolts as with the conventional method. As shown in FIG. 14, the bottom plate 16 has a gear shaped configuration with an array of radially opening slots 150 extending through the bottom plate 16. The slots 150 have a curved interior end 152 with a rectangular radial opening 154 in the illustrated form, but other suitable configurations can be contemplated.

Figure 15:
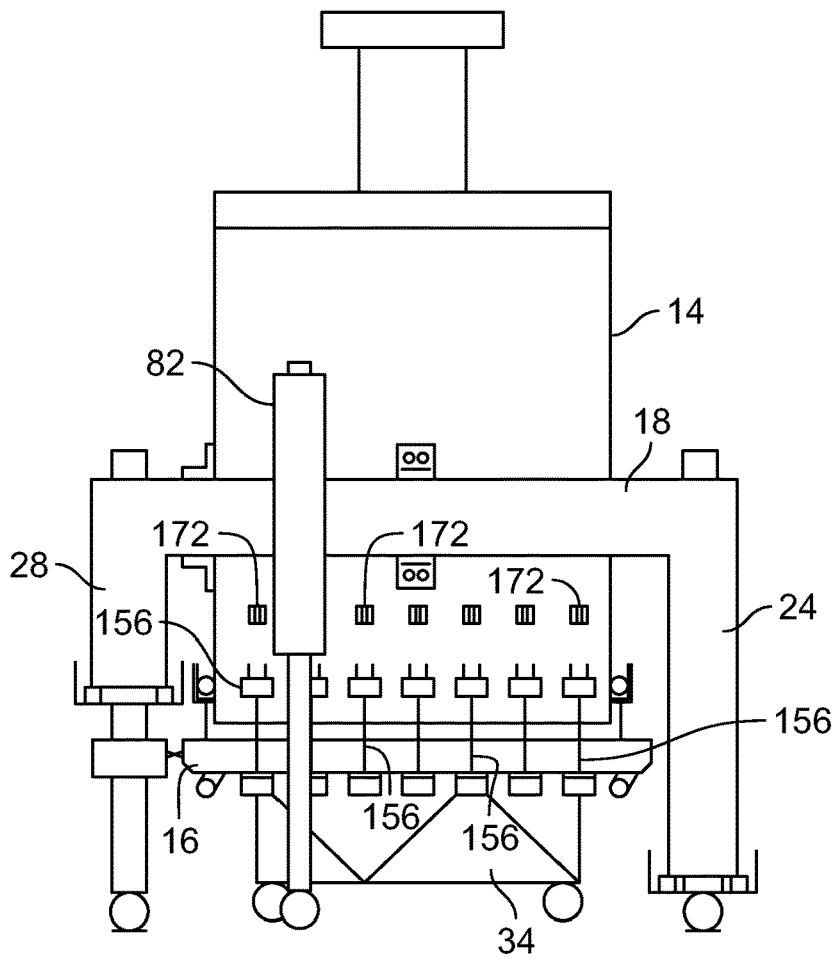
FIG. 15 is a side plan view of a chromatography and synthesis column including the bottom plate of FIG. 14 and a main tube showing pendulum members to secure the bottom plate to the main tube in accordance with various embodiments.
Figure 16:
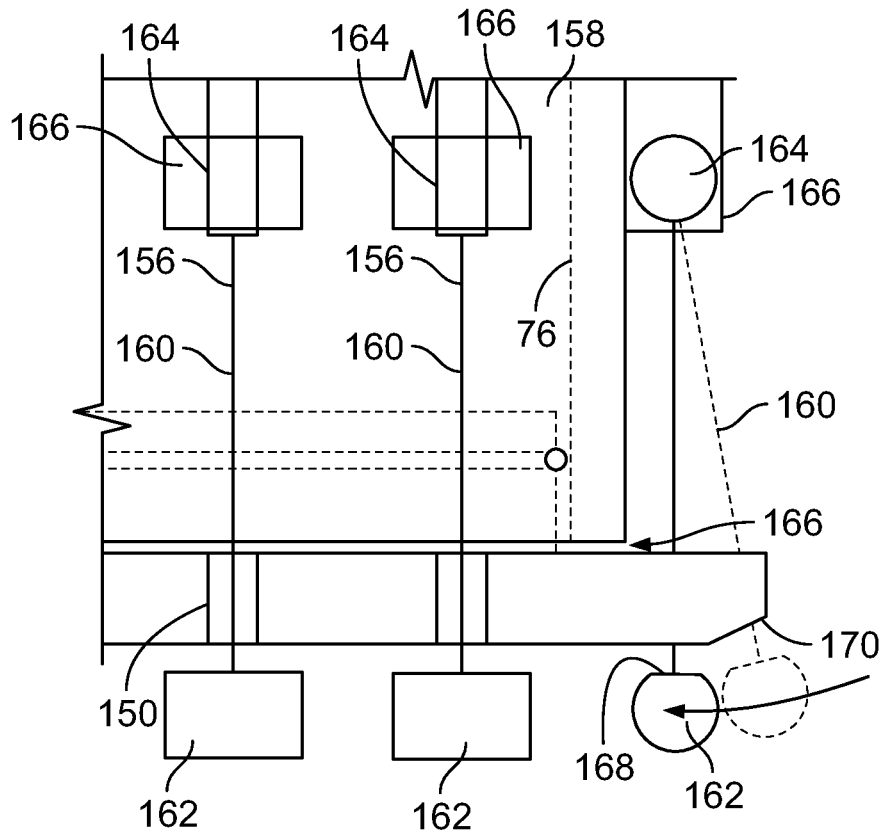
FIG. 16 is a sectional side view of the chromatography and synthesis column of FIG. 15 in accordance with various embodiments.
Figure 17:
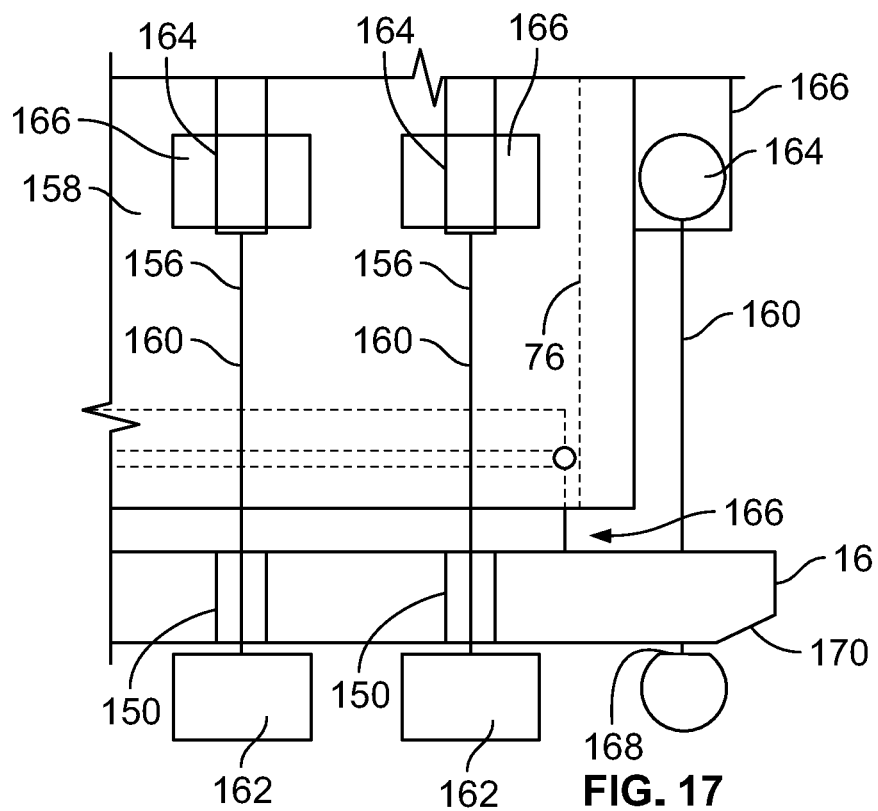
FIG. 17 is a sectional side view of the chromatography and synthesis column of FIG. 15 in accordance with various embodiments.

As shown in FIGS. 15-17, the main tube 14 has a plurality of pendulum members 156 that are pivotably coupled to an exterior 158 of the main tube 14 at spaced radial positions. Each pendulum member 156 includes a stem portion 160, a distal, enlarged retaining portion 162, and a proximal end 164. Each pendulum member 156 can be coupled to the main tube 14 by any suitable method, including brackets 166 as shown. For example, in the illustrated form, the pendulum members 102 are I-bars and the proximal end 164 is retained with the brackets 166 secured to the main tube 14 so that the pendulum members 156 can be pivoted along a vertical plane. So configured, to secure the bottom plate 16 to the main tube 14, a user can pivot each of the pendulum members 156 so that the retaining portions 162 are disposed below the bottom plate 16, which prevents the bottom plate 16 from being removed.

By one approach, the stem portion 160 of each pendulum member 156 is sized so that the retaining portion 162 can clear the bottom plate 16 when the plug portion 25 thereof is fully received within the main tube 14, i.e., the hydraulic cylinders 54 are lowered to make the main tube 14 fully seat on the bottom plate 16 and compress a compliance gap 166. Thereafter, as a result of gravity, packing, or other operation, the plug portion 25 of the bottom plate 16 slides downwardly to expand the compliance gap 166 and abut the retaining portions 110 of the pendulum members 102. The seal between the plug portion 25 and the main tube 14 remains hermetic through this movement because the seal is an internal seal and the seal 77 is spaced from the bottom plate 16 a sufficient distance to allow for the expansion of the compliance gap 166. As a result, the pendulum members 102 capture the bottom plate 16 and secure the bottom plate 16 to the main tube 14 without the use of bolts. By one approach, a lower outer corner 170 of the bottom plate 16 can be chamfered or rounded to reduce the arcuate path of the retaining portion 110 to pivot to a position below the bottom plate 16. If desired, the retaining portions 162 can have a flat radially inward surface 168 to provide a larger seating area for the bottom plate 16. As shown in FIGS. 16 and 17, the proximal end 164 of each pendulum member 156 can have a similar configuration as the retaining portion 162. With this configuration, the flat surface 168 can provide a distinguishing feature for a user installing the pendulum members 156.

Similarly, to remove the bottom plate 16, a user can lower the main tube 14, or raise the bottom plate 16, so that the plug portion 25 is inserted further therein and the compliance gap 166 is reduced. With this insertion, the retaining portions 162 will be spaced from the bottom plate 16, which allows a user to pivot the pendulum members 156 to a storage position spaced radially from or disposed above the bottom plate 16. By one approach, coupling brackets 172 can be mounted to the main tube 14 above the pivoting brackets 166. The coupling brackets 172 can be configured to retain the pendulum members 156 in a generally vertical orientation by clips, snap-fit, friction-fit, or other suitable methods.

Figure 18:
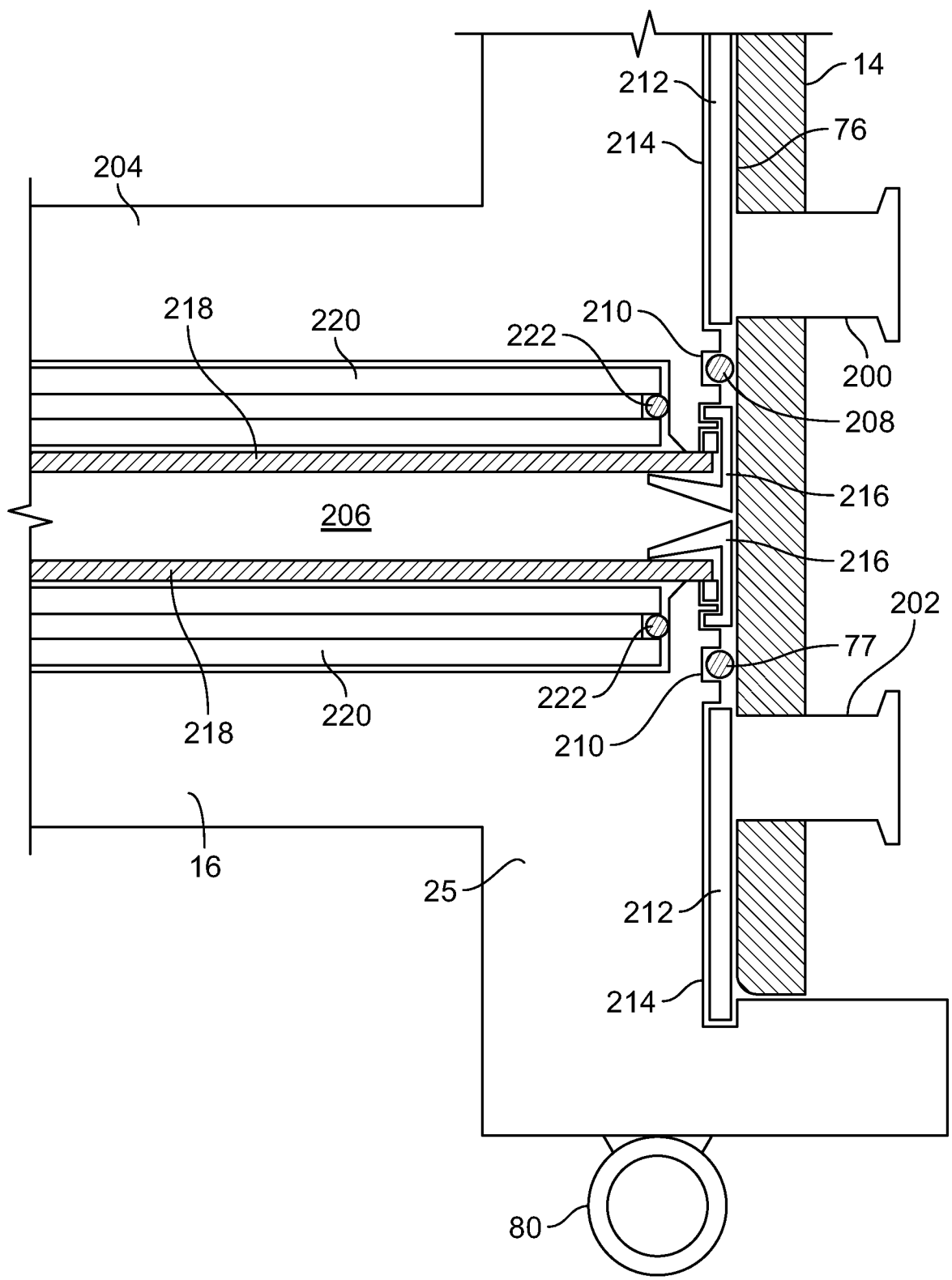
FIG. 18 is a side cross-sectional view of a chromatography and synthesis column with a bottom plate inserted to cover a slurry port in accordance with various embodiments.
Figure 19:
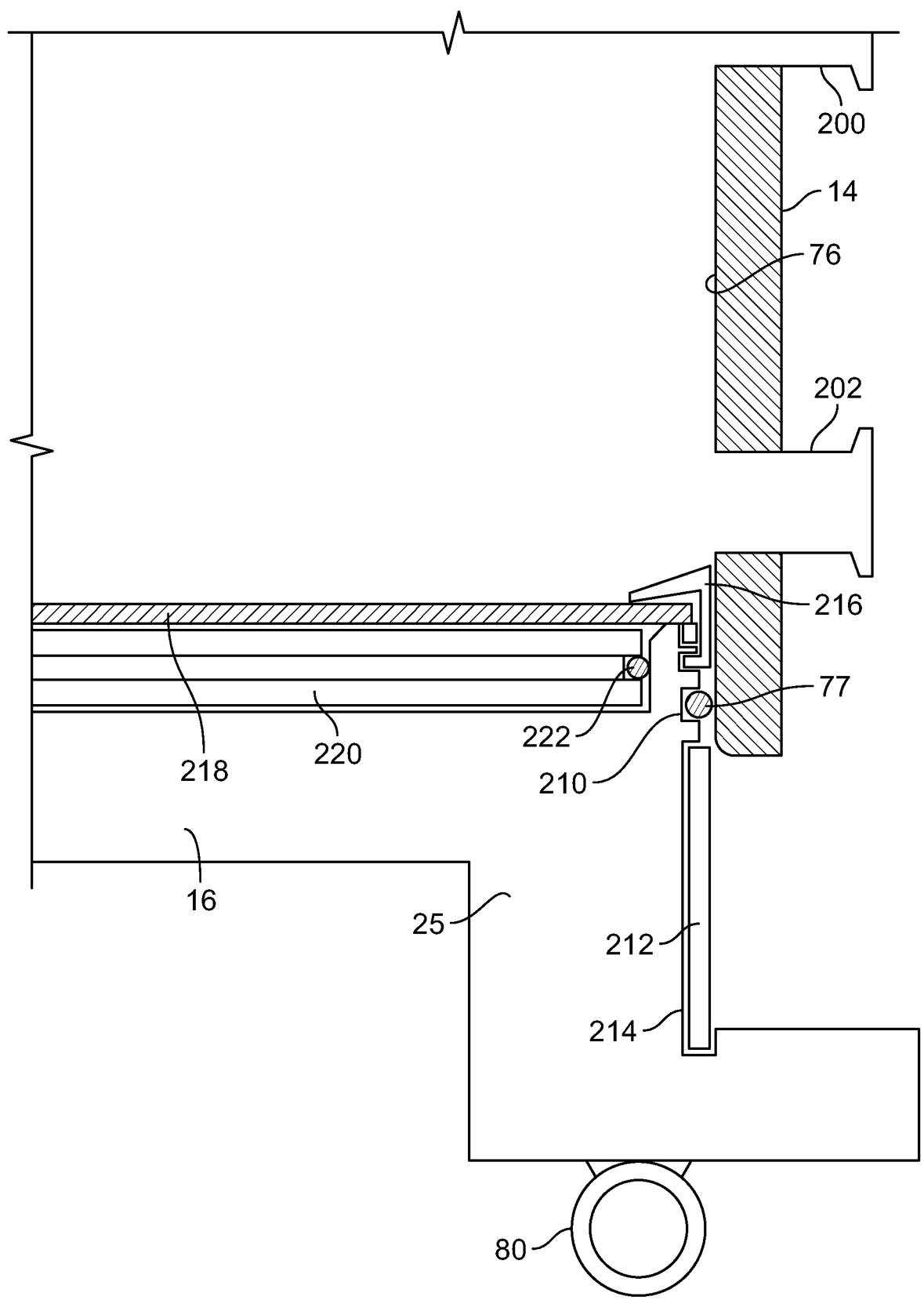
FIG. 19 is a side cross-sectional view the chromatography and synthesis column of FIG. 18 in accordance with various embodiments.

A further embodiment for the column 12 is shown in FIGS. 18 and 19 where the main tube 14 includes upper and lower slurry ports 200, 202. In operation, the bottom plate 16 is coupled to the main tube 14 and a piston 204 is driven downwardly to pack the bed 206 between the piston 204 and the bottom plate 16. A seal 208 of the piston 204 and the bottom plate seal 77 extend circumferentially around the piston 204 and bottom plate 16 respectively within a seal groove 210. The piston 204 and bottom plate 16 each further include a glide ring 212 disposed within a groove 214 extending circumferentially around the piston 204 and bottom plate 16 respectively. As shown, the piston 204 and bottom plate 16 can further include a scraper seal 216, a fritt 218, and a distributor plate 220 with a seal 222.

In this embodiment, the plug portion 25 of the bottom plate 16 has a larger depth than conventional plates so that the plug portion 25 projects further into the main tube 14. This additional depth can be utilized so that the seal 77 is driven past the lower slurry port 202 for operation. In the illustrated form, the glide ring 212 extends across the lower slurry port 202. The hydraulics 54 configuration described above can advantageously be utilized to drive the additional depth of the bottom plate 16 into the main tube 14.

Similarly, the piston 204 is driven downwardly within the main tube 14 so that the seal 208 is disposed below the upper slurry port 200 and the glide ring 212 extends across the upper slurry port 200. So configured, the lower and upper slurry ports 200, 202 are hidden to avoid disturbing the plug flow and to obtain better chromatography, i.e., higher plate count, HETP.

Advantageously, the upper and lower slurry ports 200 can be utilized to re-slurry or process soft beds in the column 12. Additionally, the upper and lower slurry ports 200 can be utilized to transfer the bed 206 in a closed system. To utilize these features, the piston 204 is raised to expose the upper slurry port 200 and the bottom plate 16 is lowered to expose the lower slurry port 202, such as by use of the hydraulics 54 and removable couplings 81 described above.

Those skilled in the art will recognize that a wide variety of modifications, alterations, and combinations can be made with respect to the above described embodiments without departing from the scope of the disclosure, and that such modifications, alterations, and combinations are to be viewed as being within the ambit of the inventive concept. Further, one or more of the above components, assemblies, and embodiments can be utilized to retrofit current columns to provide the features and advantages described herein.

The invention claimed is:

1. A base assembly for a chromatography column having a main tube and a bottom plate, the base assembly comprising:
   a frame secured to the main tube of the chromatography column;
   legs mounted to the frame to support the chromatography column in an upright orientation;
   hydraulic cylinders of each of the legs configured to raise and lower the frame, wherein the hydraulic cylinders are connected in series.

2. The base assembly of claim 1, wherein each of the legs comprise a base, and each hydraulic cylinder is supported by the base with a portion thereof engaging the frame.

3. The base assembly of claim 2, wherein the frame comprises tubular leg portions extending downwardly toward the bases of the legs, the hydraulic cylinders extending within the tubular leg portions, and the legs further comprise an upstanding wall extending around a perimeter of the base, the upstanding wall configured to telescope with the tubular leg portions as the hydraulic cylinders move the frame.

4. The base assembly of claim 3, wherein the legs further comprise one or more bearings configured to orient the hydraulic cylinders within the tubular leg portions of the frame.

5. The base assembly of claim 1, wherein the hydraulic cylinders comprise double acting, double rod cylinders, and further comprising a control circuit configured to control operation of the hydraulic cylinders.

6. The base assembly of claim 5, wherein the control circuit comprises an air driven hydraulic circuit.

7. The base assembly of claim 5, wherein the control circuit comprises a pendant having user inputs configured to lift and lower the main tube by operating the hydraulic cylinders.

8. The base assembly of claim 1, further comprising a rigid swing arm having a proximal end coupled to one of the legs and a distal end coupled to the bottom plate, the swing arm configured to guide pivoting of the bottom plate along a horizontal plane, and wherein the one of the legs is spaced from at least another one of the legs a distance sized so that the bottom plate can be pivoted therebetween along a radius of the swing arm.

9. The base assembly of claim 8, further comprising a carriage and wherein the bottom plate is mounted on the carriage, such that the bottom plate can be conveyed on the carriage and movement of the carriage can be directed by pivoting of the swing arm.

10. The base assembly of claim 9, further comprising one or more removable couplings disposed between the bottom plate and the legs to hold the bottom plate stationary while the hydraulic cylinders raise the main tube, and wherein the proximal end of the swing arm comprises a bearing coupled to the one of the legs and configured to slide therealong.

11. The base assembly of claim 1, wherein the frame has a pentagon shape extending around a rectangular portion and a triangular portion, and the legs comprise two rear legs mounted at distal corners of the rectangular portion and a front leg mounted at a proximal corner of the triangular portion.

12. The base assembly of claim 11, further comprising telescoping legs mounted at intermediate corners of the frame, each of the legs and the telescoping legs comprising casters mounted on ends thereof, such that the telescoping legs are configured to cooperate with the legs to provide stable movement of the chromatography column.

13. The base assembly of claim 1 in combination with the chromatography column, the combination further comprising a plurality of pendulum members pivotably mounted to the main tube, each of the plurality of pendulum members comprising a stem portion and a distal, enlarged retaining portion, and
   wherein the bottom plate includes an array of radially opening slots, each of the slots aligned with one of the plurality of pendulum members, each of the pendulum members configured to be pivoted so that the stem portion extends through the respective slot and the retaining portion is disposed below the bottom plate and configured to abut a bottom surface of the bottom plate to retain the bottom plate on the main tube.

14. The combination of claim 13, wherein the bottom plate includes a plug portion configured to extend into the main tube and seal to an interior surface of the main tube, and the stem portion is sized so that the retaining portion clears the bottom plate when pivoted only when the plug portion is fully received within the main tube.

15. The combination of claim 13, wherein a corner of the bottom surface of the bottom plate is chamfered to provide clearance for the retaining portion of the pendulum.

16. A base assembly for a chromatography column having a main tube and a bottom plate, the base assembly comprising:
   a frame secured to the main tube of the chromatography column;
   legs mounted to the frame to support the chromatography column in an upright orientation;
   a rigid swing arm having a proximal end mounted to one of the legs and a distal end mounted to the bottom plate, the swing arm configured to guide pivoting of the bottom plate along a horizontal plane, and
   wherein the one of the legs is spaced from at least another one of the legs a distance sized so that the bottom plate can be pivoted therebetween along a radius of the swing arm.

17. The base assembly of claim 16, further comprising a carriage, and wherein the bottom plate is mounted on the carriage, such that the bottom plate can be conveyed on the carriage and movement of the carriage can be directed by pivoting of the swing arm.

18. The base assembly of claim 16, wherein the frame has a pentagon shape extending around a rectangular portion and a triangular portion, and the legs comprise two rear legs mounted at distal corners of the rectangular portion and a front leg mounted at a proximal corner of the triangular portion, wherein the proximal end of the swing arm is mounted to the front leg.

19. The base assembly of claim 16, wherein the frame has a rectangular shape with the legs mounted to corners of the frame.

* * * * *